US012380327B2

(12) United States Patent
Mv et al.

(10) Patent No.: US 12,380,327 B2
(45) Date of Patent: Aug. 5, 2025

(54) DETECTION OF CONTAINER INCIDENTS USING MACHINE LEARNING TECHNIQUES

(71) Applicant: Dell Products L.P., Round Rock, TX (US)

(72) Inventors: Balakrishnan Mv, Bangalore (IN); Proma Mukherjee, Kolkata (IN); Varadharajan Krishnamurthy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 907 days.

(21) Appl. No.: 17/502,503

(22) Filed: Oct. 15, 2021

(65) Prior Publication Data

US 2023/0117731 A1 Apr. 20, 2023

(51) Int. Cl.
*G06F 18/241* (2023.01)
*G06F 18/21* (2023.01)
*G06N 3/044* (2023.01)
*G06N 3/045* (2023.01)
*G06N 3/08* (2023.01)

(52) U.S. Cl.
CPC .............. *G06N 3/08* (2013.01); *G06F 18/217* (2023.01); *G06F 18/241* (2023.01); *G06N 3/044* (2023.01); *G06N 3/045* (2023.01)

(58) Field of Classification Search
CPC .......... G06N 3/08; G06N 3/045; G06N 3/044; G06F 18/217; G06F 18/241
See application file for complete search history.

(56) References Cited

U.S. PATENT DOCUMENTS 11,550,672 B1\* 1/2023 Kurian .................. G06F 11/202

OTHER PUBLICATIONS

Alonso J., et al, Adaptive on-line aging prediction based on Machine Learning, [received Nov. 24, 2024]. Retrieved from Internet:<https://ieeexplore.ieee.org/abstract/document/5544275?casa_token=pl5dnhrioMwAAAAA:8pyaMe4oK3azb0P23nGUTPzsGfyIAwUsXzj-hajrtEKy4CYqunaYkgfdVGgzyHCFyG4Wfjgh> (Year: 2010).\*

(Continued)

*Primary Examiner* — Miranda M Huang
*Assistant Examiner* — Bart I Rylander
(74) *Attorney, Agent, or Firm* — Ryan, Mason & Lewis, LLP

(57) ABSTRACT

Methods, apparatus, and processor-readable storage media for detecting container incidents using machine learning techniques are provided herein. An example method includes generating first and second representations of a telemetry dataset associated with a software container in an edge computing environment, the telemetry dataset including values for a set of parameters for each of a plurality of timestamps; providing the first representation to a predictive model to obtain a predicted remaining lifetime of the software container; providing the second representation of the telemetry dataset to a first machine learning model to obtain a predicted behavior of the software container; determining, using a second machine learning model, whether the predicted behavior of the software container corresponds to a pattern of behavior that is associated with previous container incidents; and triggering an automated action for the software container in response to determining that the predicted behavior corresponds to the pattern of behavior.

20 Claims, 13 Drawing Sheets

(56) References Cited

OTHER PUBLICATIONS

Bai, C., et al, Software failure prediction based on a Markov Bayesian network model, [received Nov. 24, 2024]. Retrieved from Internet:<https://www.sciencedirect.com/science/article/pii/S0164121204000081> (Year: 2003).*

Bobbio, a., et al, Stochastic Modeling Techniques in Software Aging and Rejuvenation Phenomena, [received Nov. 24, 2024]. Retrieved from Internet:<https://www.worldscientific.com/doi/abs/10.1142/9789811214578_0014> (Year: 2018).*

Du, Q., et al, Anomaly Detection and Diagnosis for Container-Based Microservices with Performance Monitoring, [received Nov. 24, 2024]. Retrieved from Internet:<https://link.springer.com/chapter/10.1007/978-3-030-05063-4_42> (Year: 2018).*

Hultgren, F., et al, Application failure predictions from neural networks analyzing telemetry data, [received Nov. 24, 2024]. Retrieved from Internet:<https://www.diva-portal.org/smash/record.jsf?pid=diva2%3A1587899&dswid=-9010> (Year: 2021).*

Lin, Q., et al, Predicting Node Failure in Cloud Service Systems, [received Nov. 24, 2024]. Retrieved from Internet:<https://dl.acm.org/doi/abs/10.1145/3236024.3236060?casa_token=AA10I354R78AAAAA:I9V40Uzw50hJGt2uBK6wEVi0cuwRsPdvLaV_QmtEGVrLiQPiHMsu-YtTWKmTjxYZRcRFlvhfaAH> (Year: 2018).*

Muralidharan, S., et al, Monitoring and Managing IoT Applications in Smart Cities Using Kubernetes, [received Nov. 24, 2024]. Retrieved from Internet:<https://peronales.upv.es/thinkmind/dl/conferences/cloudcomputing/cloud_computing_2019/cloud_computing_> (Year: 2019).*

Weiss, T., et al, DeepRacing: Parameterized Trajectories for Autonomous Racing, [received Nov. 24, 2024]. Retrieved from Internet:<https://arxiv.org/abs/2005.05178> (Year: 2020).*

Zhang, C., et al, FengHuoLun: A Federated Learning based Edge Computing Platform for Cyber-Physical Systems, [received Nov. 24, 2024]. Retrieved from Internet:<https://ieieee.org/abstract/document/9156259?casa_token=xu-I4FFDtcYAAAAA:yN9IX8700WTASwly7CPhd5cnw644DrqBJkkzAVX-Y-aPfUhHEJTDs6S7FunVEnC8> (Year: 2020).*

What Is Mean Time to Repair (MTTR)?, Splunk Inc., Available at https://www.splunk.com/en_us/data-insider/what-is-mean-time-to-repair.html, last accessed Oct. 15, 2021.

Xavier, Alexandre, An introduction to ConvLSTM, Neuronio, available at: https://medium.com/neuronio/an-introduction-to-convistm-55c9025563a7, last accessed Oct. 15, 2021, published Mar. 25, 2019.

Soni, Devin, Introduction to Markov Chains, Towards Data Science, available at https://towardsdatascience.com/introduction-to-markov-chains-50da3645a50d, last accessed Oct. 15, 2021, published Mar. 5, 2018.

* cited by examiner

MODEL: "SEQUENTIAL"

| LAYER (TYPE) | OUTPUT SHAPE | PARAM # |
|---|---|---|
| conv_lst_m2d (ConvLSTM2D) | (None, None, 51, 50, 40) | 62880 |
| batch_normalization (BatchNo | (None, None, 51, 50, 40) | 160 |
| conv_lst_m2d_1 (ConvLSTM2D) | (None, None, 51, 50, 40) | 115360 |
| batch_normalization_1 (Batch | (None, None, 51, 50, 40) | 160 |
| conv_lst_m2d_2 (ConvLSTM2D) | (None, None, 51, 50, 40) | 115360 |
| batch_normalization_2 (Batch | (None, None, 51, 50, 40) | 160 |
| conv_lst_m2d_3 (ConvLSTM2D) | (None, None, 51, 50, 40) | 115360 |
| batch_normalization_3 (Batch | (None, None, 51, 50, 40) | 160 |
| conv3d (Conv3D) | (None, None, 51, 50, 3) | 3243 |

TOTAL PARAMS: 412,843
TRAINABLE PARAMS: 411,723
NON-TRAINABLE PARAMS: 320

FIG. 8

| LAYER (TYPE) | OUTPUT SHAPE | PARAM # |
|---|---|---|
| conv2d_55 (Conv2D) | (None, 14, 14, 64) | 1664 |
| leaky_re_lu_44 (LeakyReLU) | (None, 14, 14, 64) | 0 |
| dropout (Dropout) | (None, 14, 14, 64) | 0 |
| conv2d_56 (Conv2D) | (None, 7, 7, 128) | 204928 |
| leaky_re_lu_45 (LeakyReLU) | (None, 7, 7, 128) | 0 |
| dropout_1 (Dropout) | (None, 7, 7, 128) | 0 |
| flatten (Flatten) | (None, 6272) | 0 |
| dense (Dense) | (None, 1) | 6273 |

TOTAL PARAMS: 212,865
TRAINABLE PARAMS: 212,865
NON-TRAINABLE PARAMS: 0

FIG. 9

DETECTION OF CONTAINER INCIDENTS USING MACHINE LEARNING TECHNIQUES

FIELD

The field relates generally to information processing systems, and more particularly to improving availability of such systems.

BACKGROUND

Edge computing generally refers to a distributed computing paradigm that brings computation and data storage closer to the sources of data. Edge computing environments are typically highly distributed and decentralized, and therefore present many challenges for information technology (IT) operations. For example, it is challenging to manage and monitor the components of an edge computing environment due to the large number of such components. Also, software containers executing in edge computing environments typically execute only for a short amount of time, which makes it difficult to capture or recover information for resolving potential issues.

For at least the foregoing reasons, there is a need for improved techniques to detect and address software container incidents.

SUMMARY

Illustrative embodiments of the disclosure provide techniques for detecting container incidents using machine learning techniques. An exemplary computer-implemented method includes generating a first representation and a second representation of a telemetry dataset associated with a software container in an edge computing environment, wherein the telemetry dataset comprises values for a set of parameters for each of a plurality of timestamps; providing the first representation of the telemetry dataset to a predictive model to obtain a predicted remaining lifetime of the software container; providing the second representation of the telemetry dataset to a first machine learning model to obtain a predicted behavior of the software container, wherein the predicted behavior of the software container is based at least in part on the predicted remaining lifetime of the software container; determining, using a second machine learning model, whether the predicted behavior of the software container corresponds to at least one pattern of behavior that is associated with at least one previous container incident; and triggering at least one automated action for the software container in response to determining that the predicted behavior of the software container corresponds to the at least one pattern of behavior.

Illustrative embodiments can provide significant advantages relative to conventional recovery and repair techniques for software containers. For example, challenges associated with container incidents in edge computing environments are mitigated in one or more embodiments by proactively detecting such incidents using a combination of machine learning techniques. Additionally, some embodiments enable a central server to aggregate model training results from multiple edge nodes without having to access telemetry data captured by the multiple edges nodes. These and other illustrative embodiments described herein include, without limitation, methods, apparatus, systems, and computer program products comprising processor-readable storage media.

BRIEF DESCRIPTION OF THE DRAWINGS

FIG. 8 shows an example of a specification of a machine learning model architecture for an image prediction model in an illustrative embodiment.

FIG. 9 shows an example of a specification of a discriminator model in an illustrative embodiment.

DETAILED DESCRIPTION

Figure 1:
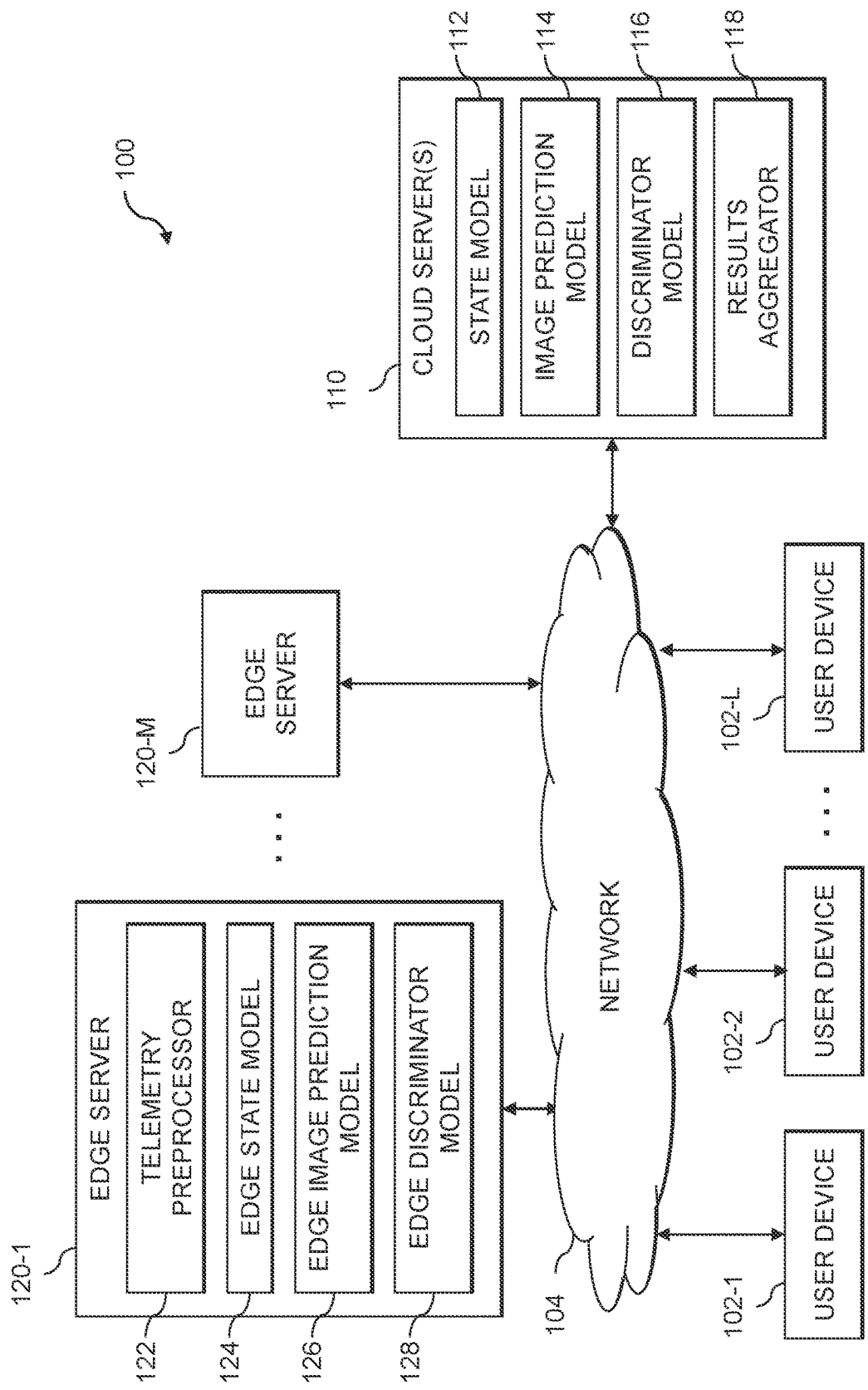
FIG. 1 shows an information processing system configured for detecting container incidents in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

In an edge computing environment, a large number (on the order of thousands or more, for example) of remote edge servers are located close to customer locations. The average lifetime of containers hosted on such edge servers depends on a number of factors including, for example, application failures and hardware resource constraints. When a container orchestration platform is used, containers typically have a much shorter lifetime than containers that are run without orchestration. Orchestration platforms used in edge computing include Kubernetes (K8s) or Lightweight Kubernetes (K3s), for example. Edge computing environments have a higher churn rate of containers relative to cloud architectures because of the massive scale of distribution, heterogeneity of applications, and fragmented technology landscape associated with edge computing. For example, the average lifetime of containers in an edge computing environment may be a few hours, thereby making it difficult to capture and recover the information that is needed to resolve issues.

In order to support a wide variety of business requirements (e.g., service uptime, service quality, and accelerated service recovery), it is important to maintain a low mean time to repair/recovery (MTTR) for edge computing environments. The time to repair/recovery refers to the time from the start of an incident (or downtime) until a service is repaired/restored and running in a healthy state. The MTTR is equal to a total time spent repairing a given service divided by the number of incidents that the given service experiences. As such, one way in which the MTTR can be reduced is by reducing the time it takes to detect such incidents.

Traditional centralized cloud-based telemetry, analytics, and intelligent automation solutions are not well suited for edge computing environments, as they do not accurately predict container incidents (e.g., container crashes) resulting from application failures and/or resource constraints, for example. Also, transferring telemetry data of edge containers to a central cloud server for training and incident prediction often increases the MTTR, thereby decreasing the efficiency of repair and recovery processes.

Illustrative embodiments herein describe techniques for detecting container incidents using machine learning techniques. Additional description of these techniques is presented after an environment into which the exemplary embodiments may be used is described.

FIG. 1 shows a computer network (also referred to herein as an information processing system) 100 configured in accordance with an illustrative embodiment. The computer network 100 comprises a plurality of user devices 102-1, 102-2, . . . 102-L, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 are one or more cloud servers 110 and a plurality of edge servers 120-1, . . . 120-M, collectively referred to herein as edge servers 120.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

Also associated with the user devices 102 are one or more input-output devices, which illustratively comprise keyboards, displays or other types of input-output devices in any combination. Such input-output devices can be used, for example, to support one or more user interfaces to the user devices 102, as well as to support communication between the one or more cloud servers 110, the edge servers 120, and/or other related systems and devices not explicitly shown.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the one or more cloud servers 110 can have at least one associated database (not explicitly shown in FIG. 1) configured to store data pertaining to, for example, model training results from at least a portion of the edge servers 120. Each of the edge servers 120 can also have at least one associated database (not explicitly shown in FIG. 1) configured to store telemetry data pertaining to, for example, software containers executing on corresponding edge servers 120.

The databases associated with the cloud servers 110 and the edge servers 120 can be implemented using one or more corresponding storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

Additionally, each of the one or more cloud servers 110 and each of the edge servers 120 in the FIG. 1 embodiment is assumed to be implemented using at least one processing device. Each such processing device generally comprises at least one processor and an associated memory, and implements one or more functional modules for controlling certain features of the one or more cloud servers 110 and the edge servers 120.

More particularly, the one or more cloud servers 110 and the one or more edge servers 120 in this embodiment can each comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interfaces allow for communication between the one or more cloud servers 110, the one or more edge servers 120, and/or the user devices 102 over the network 104, and each illustratively comprises one or more conventional transceivers.

The one or more cloud servers 110 comprise a state model 112, an image prediction model 114, a discriminator model 116, and a results aggregator 118. Also, each of the edge servers 120 may include a telemetry preprocessor 122, an edge state model 124, an edge image prediction model 126, and an edge discriminator model 128 (as shown for edge server 120-1 in FIG. 1).

Generally, the telemetry preprocessor 122 obtains and processes telemetry data corresponding to at least one software container being executed at the edge server 120. The at least one software container may be associated with one or more of the user devices 102, for example. The telemetry preprocessor 122 may transform the telemetry data into formats that are digestible by the edge state model 124 and the edge image prediction model 126, for example. In some embodiments, the telemetry preprocessor 122 generates a state transition graph and a sequence of visual image frames based on the telemetry data (as described in more detail in conjunction with FIGS. 2A-2B and 3-5, for example).

In some embodiments, the edge state model 124 is configured to model uptime events of the at least one software container to predict a container lifetime based on the state transition graph, and the edge image prediction model 126 uses the sequence of visual image frames to predict a next image frame that follows the input sequence. Further image frames may be iteratively predicted for the next image frame based on the predicted lifetime. For each iteration, the edge discriminator model 128 determines whether the next image frame matches one or more incident patterns based on image patterns from past incidents. In the FIG. 1 example, it is assumed that models 124, 126, and 128 are different models, however, it is to be appreciated that one or more of the models 124, 126, and 128 may be combined, or portions thereof, into a single model (e.g., a hybrid machine learning model).

Also, in at least some embodiments, the one or more cloud servers 110 transmit global models corresponding to state model 112, image prediction model 114 and discriminator model 116 to at least a portion of the edge servers 120. Given ones of the edge servers 120 can locally train (or re-train) the global models using their respective telemetry data to obtain the edge state model 124, the image prediction model 126, and the edge discriminator model 128. The results aggregator 118 obtains and aggregates the model training results from the individual edge severs 120 and uses the aggregated information to update the state model 112, image prediction model 114, and discriminator model 116, without needing to access the telemetry data captured by the edge servers 120. The updated global models can be deployed to the edge servers 120 and, optionally, one or more other edge servers 120 that were recently brought online. These and other features of the elements 112-118 and/or elements 122-128 are described in more detail elsewhere herein.

It is to be appreciated that the particular arrangement of elements 112-118 illustrated in the one or more cloud servers 110, and the particular arrangement of elements 122-128 in the edge servers 120 of the FIG. 1 embodiment are presented by way of example only, and alternative arrangements can be used in other embodiments. For example, the functionality associated with the elements 112-118 and/or elements 122-128 in other embodiments can be combined into a single module, or separated across a larger number of elements. As another example, multiple distinct processors can be used to implement different ones of the elements 112-118 and/or elements 122-128 or portions thereof.

At least portions of elements 112-118 and/or elements 122-128 may be implemented at least in part in the form of software that is stored in memory and executed by at least one processor.

It is to be understood that the particular set of elements shown in FIG. 1 for one or more cloud servers 110 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the one or more cloud servers 110 and at least one associated database can be on and/or part of the same processing platform.

An exemplary process utilizing elements 122-128 of an example edge server 120 in computer network 100 will be described in more detail with reference to, for example, the flow diagrams of FIGS. 6 and 10.

An exemplary process utilizing elements 112-118 of an example cloud server 110 in computer network 100 will be described in more detail with reference to, for example, the flow diagram of FIG. 11.

In one example embodiment, a process includes capturing telemetry data of software containers hosted by edge nodes at regular intervals of time and encoding the telemetry data into two different formats. For instance, the telemetry data may be encoded into at least one state transition graph and a sequence of visual image frames. The state transition graph is used by a predictive model (e.g., a stochastic model such as a Markov Chain model) to predict a remaining container lifetime. The sequence of visual image frames is observed by a Convolutional Long Short-Term Memory (LSTM) Network model to predict a next image frame in the sequence. Also, a discriminator is used to ascertain if the newly generated image matches an incident pattern corresponding to past sequences of images frames that resulted in container incidents. The term "incident" in the context of containers is intended to be broadly construed so as to encompass an event when a software container is no longer performing as expected, such as failures or errors associated with software and/or hardware, for example.

The image generation and discriminator verification process can be repeated iteratively for the remaining container lifetime, as predicted using the Markov chain model, for example. A federation learning process, in some embodiments, is used to aggregate information (e.g., training results) of machine learning models from different edge nodes and to update the global nodes in a central cloud server. The updated models may be shared with other edge nodes, for example.

Additional details related to machine learning techniques relevant to at least some of the embodiments are now described.

A Markov chain model generally refers to a stochastic model that describes a sequence of possible events in which a probability of each event depends only on the state attained in the previous event. As an example, a simple Markov chain model may be represented as a graph, where each state corresponds to a node, and each state is connected through a directed edge. Additionally, the Markov chain may include transition probabilities between the states, where represents the probability from a state $S_i$ to a state $S_j$. These probabilities may be represented in a matrix, referred to as a transition probability matrix. The probability of any path on a Markov chain is equal to a product of the respective transition probabilities along the path. For instance, the probability for a path from S0→S1→S2→S3 may be computed as $P_{0,0} \times P_{0,1} \times P_{1,2} \times P_{2,3}$.

An application container hosted on the edge server during its uptime transitions through various states from initial start-up (which can be considered a "healthy" state) to multiple interim states (e.g., sub-optimal health states), and then end in a crash, or unhealthy, state. In this manner, at least some embodiments model the container uptime events with respective states using a Markov chain model.

Deep computer vision is another type of machine learning technique, where input is obtained in the form of two-dimensional images or videos, and the system learns high level features in different image categories, for example. To preserve the spatial structure of the given input image, the system may use a Convolutional Neural Network (CNN), which is a specialized form of a Deep Neural Network (DNN) architecture. A CNN connects a window of an input (e.g., a portion of an image) layer to a single neuron in the (subsequent) hidden layer. Connections are defined by sliding the window across the input image. To learn visual features, a filter of size (n×n) may be selected, and a set of weights is assigned to the filter. The filter is applied on the window size (n×n) in input, and then shifted by k pixels for a next window (k<n). The convolution operation of applying a filter generates a feature map. Multiple filters can be used for extracting different features. Max pooling is a pooling operation that identifies a feature map containing the most prominent features. By stacking multiple layers of convolution, it is possible to extract low-level, mid-level, and high-level features for a given image category. For instance, low-level features may correspond to edges, curves, and color; mid-level features may correspond to parts of objects; and high-level features may correspond to complete objects. A fully connected (dense) layer can then use these features for classifying the input image. Accordingly, the output may be expressed as a probability of the input image belonging to a particular class.

According to some embodiments of the present disclosure, telemetry data of a given application container are time-sliced and represented as images, and a deep vision model can observe these images and learn high level features autonomously, for example.

Deep sequence models generally address problems that require sequential processing of data. As such, a fundamentally different type of Neural Network (NN) architecture is needed that can handle variable length input, track long term dependencies, and preserve temporal features. A recurrent NN (RNN) is one type of deep learning algorithm, where a single RNN cell includes a loop by design that allows the model to maintain information about previous events in a sequence, thus allowing the information to be persisted over time. A RNN also computes its internal state and passes the state from one time step to the next. Based on the number of inputs and outputs, a RNN can take different forms, including "many-to-one" and "many-to-many" forms, for example.

A traditional RNN does not capture long term dependencies due to what is known as the vanishing gradient problem. To address this problem, a LSTM cell can be used that operates with three types of gates to control information propagation. For example, a forget gate "forgets" irrelevant parts of the prior state, an input/update gate selectively updates cell state values, and an output gate outputs a filtered version of the cell state.

Telemetry data is time-based, and so embodiments of the present disclosure can leverage an LSTM model to preserve temporal features and identify long term dependencies in the data, which helps to predict the immediate time step result. A convolutional LSTM combines the potentials of both a CNN and a LSTM. A convolutional LSTM is similar to an LSTM, but the input transformations and recurrent transformations are both convolutional. Such a layer can be used to process timeseries of images (including video-like data, for example). The convolutional LSTM model can observe and learn spatial and temporal features of the video-like data and predict the next frame in a video using inputs that are timeseries of two-dimensional grids of sensor values, for example.

In some embodiments, the telemetry data of a given application container is time-sliced and represented as a sequence of images, and a convolutional LSTM observes each frame in the sequence, learns the spatial and temporal features in those frames, and predicts the next frame in the sequence. By way of example, the edge image prediction model 126 of edge server 120-1 in FIG. 1 may comprise a convolutional LSTM and the edge discriminator model 128 of edge server 120-1 may comprise a discriminator model. In such embodiments, the discriminator model can include a CNN-based image classifier, which can optionally be implemented as a standalone unit. The discriminator can be trained with a particular class of images in order to detect if a given input image belongs to that class or not. Thus, if telemetry data of a given application container is time sliced and represented as images, the discriminator, in some embodiments, can be trained exclusively by selecting only a subset of images frames that occurred immediately prior to a container incident. The subset of images can correspond to a particular period of time before the container incident, for example, and the trained discriminator is used to classify whether or not a given image frame matches a pattern of a container incident.

Additionally, some embodiments apply federated learning techniques to update one or more global models. Federated learning is used to train NNs across multiple devices, where a single global dense NN is stored in a central server. The data used to train the dense NN is stored locally across multiple nodes, which are often heterogeneous. On the node side, the dataset is kept private, and the local weights are updated in one or more iterations. On the server side, the uploaded weights from each of the nodes are aggregated using an aggregation function, and the weights are updated for the next round of training. As a non-limiting example, an average function can be used to aggregate the uploaded weights and update the global model, which then can be replicated across all the end devices on an as-needed basis. The end devices can then use the updated model to make predictions locally. Due to the heterogeneity of federated learning, it is not necessary for all nodes to participate in one synchronization. In at least one embodiment, a portion of the nodes may be randomly selected to perform the computation. The federated learning techniques may be used to update at least one the models 112, 114, and 116 of FIG. 1. As an example, the state model 112 associated with the cloud server 110 can correspond to a global model and the edge state model 124 can correspond to a local model.

The telemetry data relate to the use and performance of containers hosted by the edge servers 120. In this manner, a unified telemetry framework can be used to gather the telemetry data at the respective edge servers 120. By regularly assessing the operating conditions of the containers and analyzing the live stream of telemetry data produced by the containers, the combination of the multiple models 124, 126, and 128 of the edge server 120-1 can be used to accurately predict a container incident ahead of time, and one or more proactive actions (e.g., self-healing) can be triggered to avoid service downtime, for example.

Figure 2:
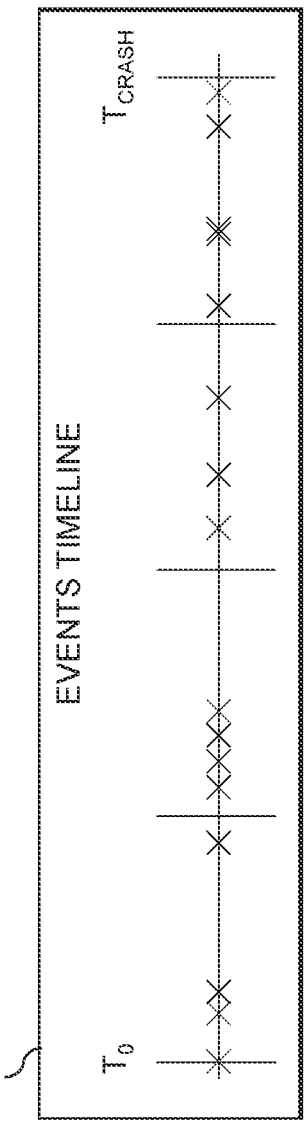
FIGS. 2A-2B show data preprocessing techniques for training a predictive model in an illustrative embodiment.

FIGS. 2A-2B show data preprocessing techniques for training a predictive model (such as the edge state model 124). The data preprocessing techniques, in some embodiments, are applied by the telemetry preprocessor 122 to generate data in a format digestible by the edge state model 124.

In particular, FIG. 2A shows an events timeline 202 for the time period $T_0$ to $T_{CRASH}$, where $T_{CRASH}$ corresponds to the time when a container incident occurred. The X's shown on the timeline of FIG. 2A correspond to different events of the container.

Referring also to FIG. 2B, this figure shows a process for converting a telemetry dataset 204, corresponding to the events timeline 202 shown in FIG. 2A, into a set of states in state table 208. In this example, the telemetry dataset 204 is for a given container and includes a column, T, of timestamps and a plurality of columns (i.e., $M_1, M_2, \ldots M_i$) that include telemetry data for each of the timestamps. In one embodiment, the dataset 204 is converted into an intermediate dataset 206 using a Principal Component Analysis (PCA). For example, the PCA may reduce the number of variables (namely, $M_1, M_2, \ldots M_i$) to a smaller set of uncorrelated variables, $N_1, N_2, \ldots N_j$, where j<i. For each variable in the set $\{N_1, N_2, \ldots N_j\}$, the values are assigned to one of a set of buckets. In FIG. 2B, the set of buckets include Low, Medium, and High buckets. Each unique combination of bucketed telemetric data $\{N_1, N_2, \ldots N_j\}$ is then converted into a particular state to generate a set of states $\{S_0, S_1, \ldots S_k\}$ as depicted by the state table 208. The set of states are transformed into a state transition graph that includes a node for each state in the state table 208. An example of a state transition graph is described in more detail below in conjunction with FIG. 7.

State transition graphs resulting from the telemetry preprocessing techniques shown in FIGS. 2A-2B can be fed to a Markov chain model (corresponding to edge state model 124, for example) to update the transition probability matrix.

Figure 3:
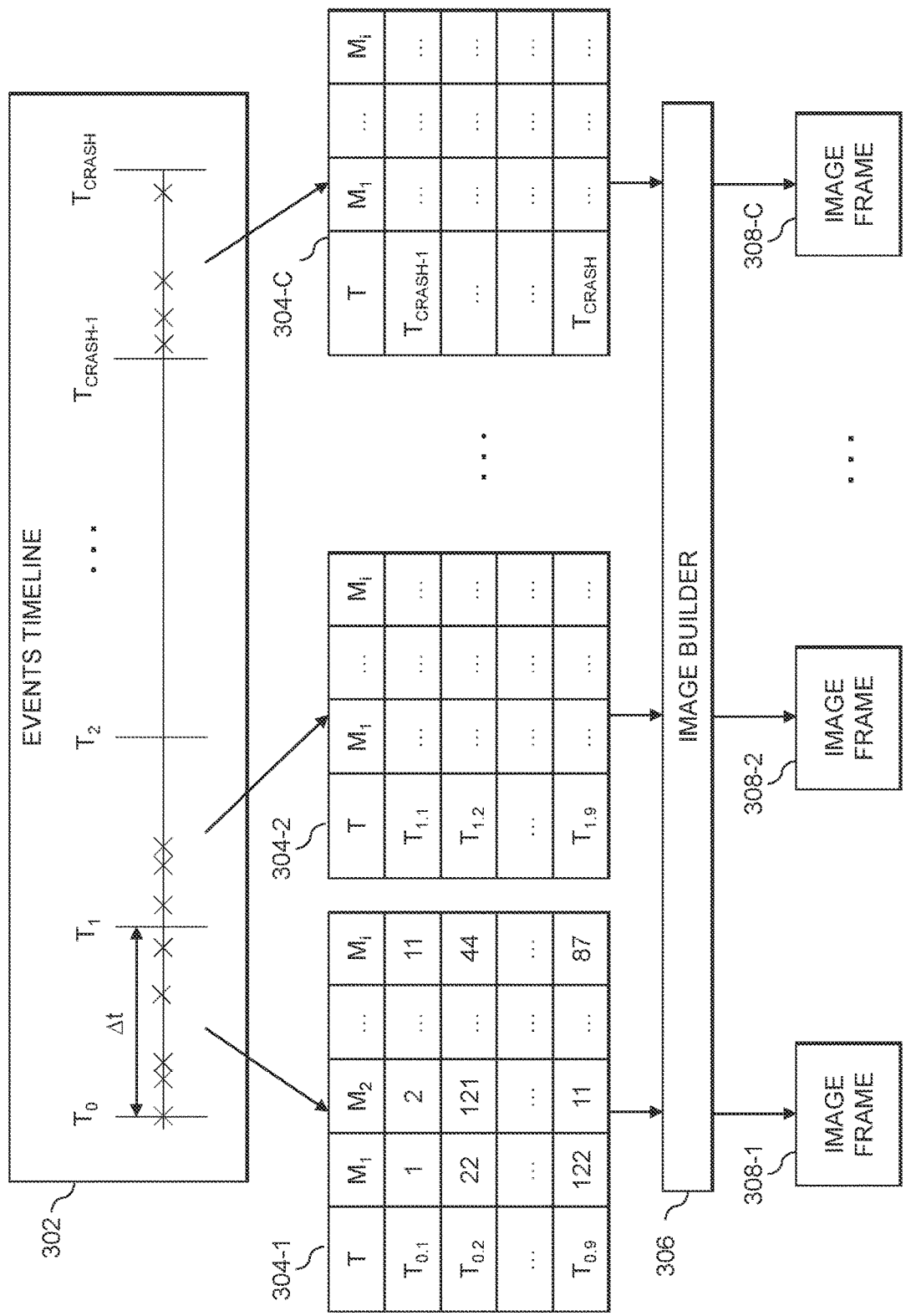
FIG. 3 shows data preprocessing techniques for training a machine learning model in an illustrative embodiment.

Referring now to FIG. 3, this figure shows data preprocessing techniques for training a first machine learning model in an illustrative embodiment. The data preprocessing techniques, in some embodiments, are applied by the telemetry preprocessor 122 to generate data in a format digestible by the edge image prediction model 126.

More particularly, FIG. 3 depicts an events timeline 302 for a time period between $T_0$ and $T_{CRASH}$. In this example, it is assumed that telemetry data for a plurality of metrics, $M_1, M_2, \ldots M_i$ are captured during the time period from $T_0$ to $T_{CRASH}$ in a periodic manner. The events timeline 302 also shows a defined time frame width, Δt. A telemetry dataset is created for each time slice of width Δt, depicted as telemetry datasets 304-1, 304-2, . . . , 304-C (referred to collectively as telemetry datasets 304). Each of the telemetry datasets 304 includes a number, n, of time steps, where n is equal to Δt divided by the rate the data are captured. For example, if the data are captured every 5 milliseconds and Δt is equal to 250 milliseconds, then n is equal to 50. The telemetry datasets 304 are created, for example, by extracting the telemetry data for a plurality of metrics, $M_1, M_2, \ldots M_i$, for the n time stamps. The telemetry datasets 304 are provided to an image builder 306 to create corresponding image frames 308-1, 308-2, . . . , 308-C (collectively referred to as image frames 308). It is to be appreciated that the image builder 306 can be implemented in different ways, such as being a part of the telemetry preprocessor 122 of edge server 120-1, or a separate module of edge server 120-1. The image builder 306, in some examples, can be implemented as a standalone unit (e.g., on a separate device than edge server 120-1).

Figure 4:
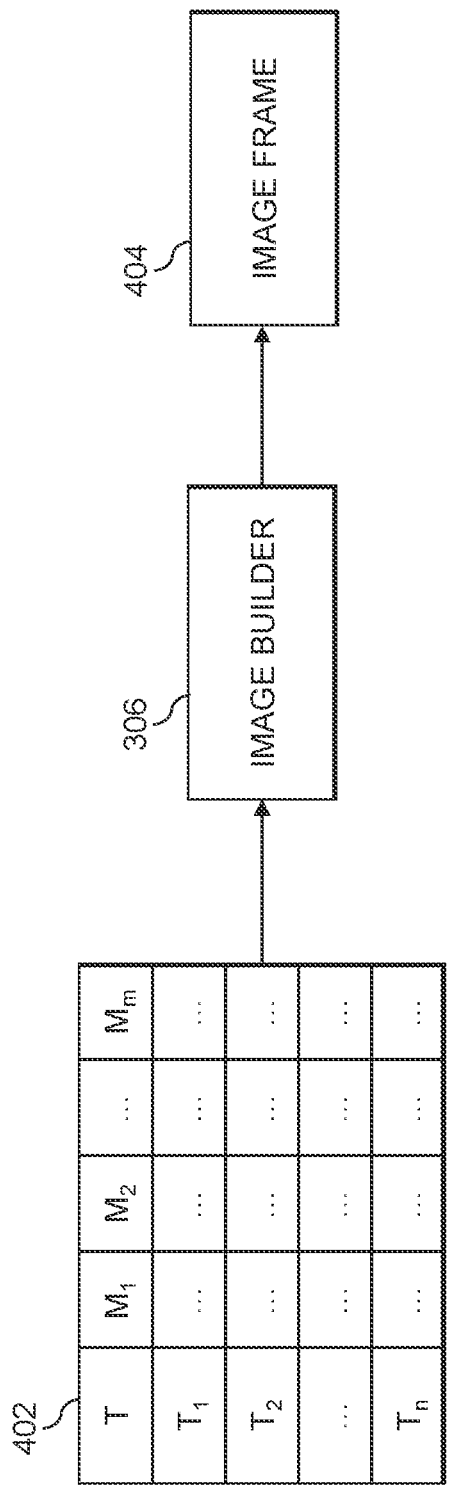
FIG. 4 shows an example of converting a telemetry dataset into an image frame in an illustrative embodiment.

Referring also to FIG. 4, this figure depicts an example of converting a telemetry dataset 402 into an image frame 404 in an illustrative embodiment. In the FIG. 4 example, the telemetry dataset corresponds to telemetry data for a set of metrics ($M_1, M_2, \ldots, M_m$) captured over n timestamps ($T_1, T_2, \ldots, T_n$). The image builder 306 obtains the dataset 402 as input, in the form of a matrix of size m×n, and generates an output RGB (red, green, blue) image of size n×m pixels. Each row in the image frame 404 represents one of the metrics captured for the given container, and each column represents the corresponding time position. Thus, if the image frame 404 is generated based on a set of fifty container metrics, then it would include one row for each of the fifty container metrics. As such, the data corresponding to the entire timeline 302 in FIG. 3, are sliced into multiple time slices per Δt, which is used by the image builder 306 to build a sequence of image frames in a video-like format.

The parameters of telemetry data captured for a container on a platform (such as a Kubernetes platform) may include, for example, timestamps, container identifiers, total container CPU system seconds, total container CPU usage seconds, total container CPU user seconds, a number of container file descriptors, total container memory working set bytes, total container network receive bytes, container network receive packets, container network transmit bytes, etc.

An example of an algorithm for performing the RGB color-coding logic is as follows:
1. Transform each telemetry data value onto the RGB color space.
2. Select a telemetry parameter (e.g., $M_1$), which ranges from $V_{Min}$ to $V_{Max}$.
3. Normalize the given parameter value V using the following formula:
   NV=(V−$V_{Min}$)/($V_{Max}$−$V_{Min}$), wherein NV is the normalized value.
4. Map the normalized value, NV, to the RGB color space using the following formula:
   CV=NV*16777215, where CV is a color value
   16777215—Highest value of RGB vector (#FFFFFF)
5. Convert the vector above to an RGB vector using:
   R=CV//256//256%256
   G=//256%256
   B=CV %256

The algorithm above is merely an example of an encoding algorithm, and those skilled in the art will appreciate that other algorithms may also be used for performing the RGB color-coding logic.

The sequence of image frames 308 can be used to train the edge image prediction model 126. For example, the sequence of image frames 308 and the sequence of image frames 308 shifted by a particular number of time steps "x" may be provided as input, where x is user defined, for example. After several epochs of training, the edge image prediction model 126 may be used to predict a next image frame that follows a given input sequence of image frames.

The edge discriminator model 128, in some embodiments, corresponds to a CNN-based image classifier. The telemetry preprocessor 122 may prepare training data for the edge discriminator model 128 in a similar manner as described for the edge image prediction model, except that only the last "z" number of frames are used. For example, the number, z, of frames may correspond to a prominent crashing pattern of a container prior to the crash. The discriminator is trained on those image frames and can help predict whether or not a given input image matches the crashing patterns. In one such embodiment, the parameter "z" is defined based on an amount of time required to perform a proactive service recovery or repair. Accordingly, the system can predict the container incident far enough in advance so that a repair or recovery action can be performed before the container incident occurs, thereby reducing the likelihood of down time, for example.

Figure 5:
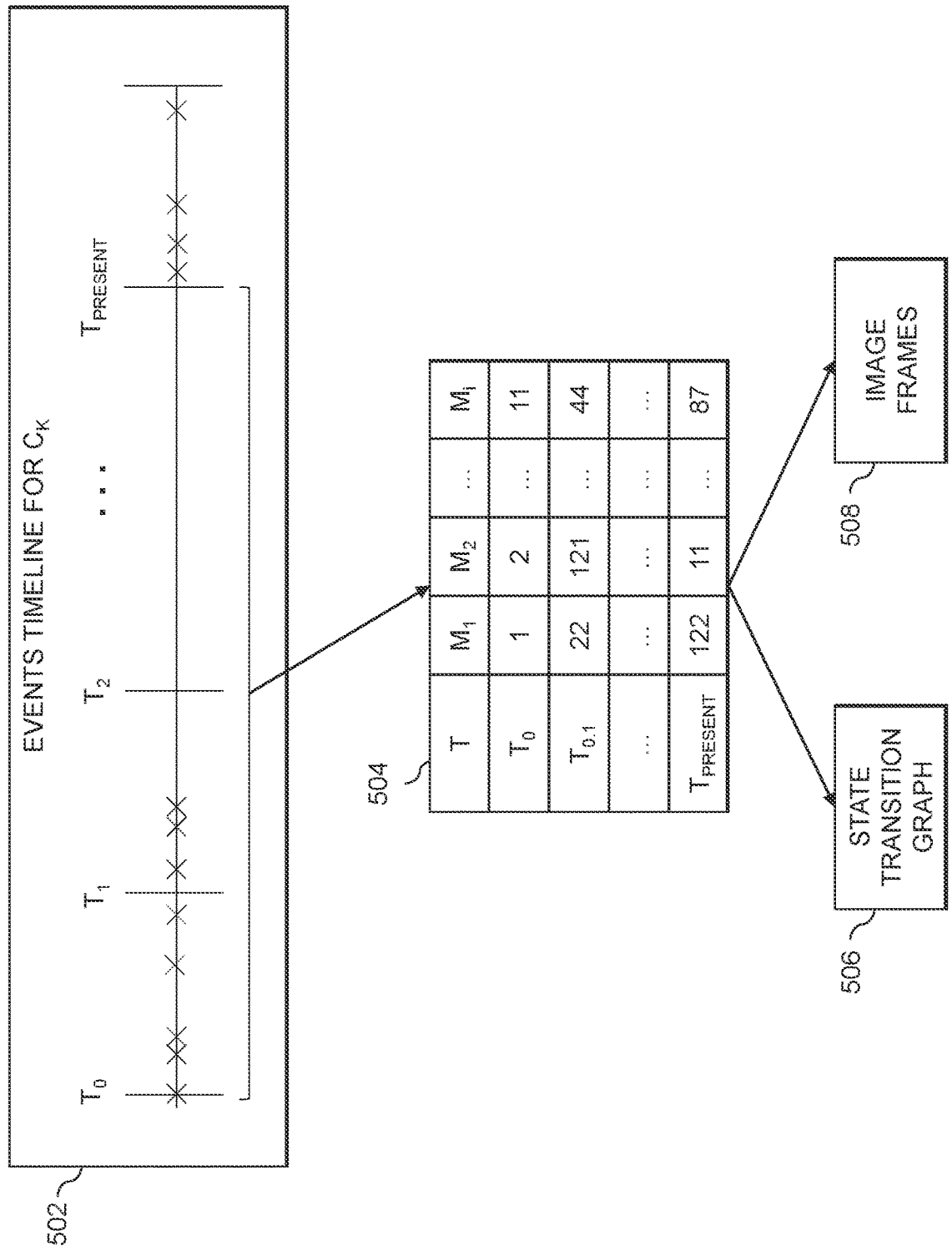
FIG. 5 shows data preprocessing techniques for predicting container incidents in an illustrative embodiment.
Figure 6:
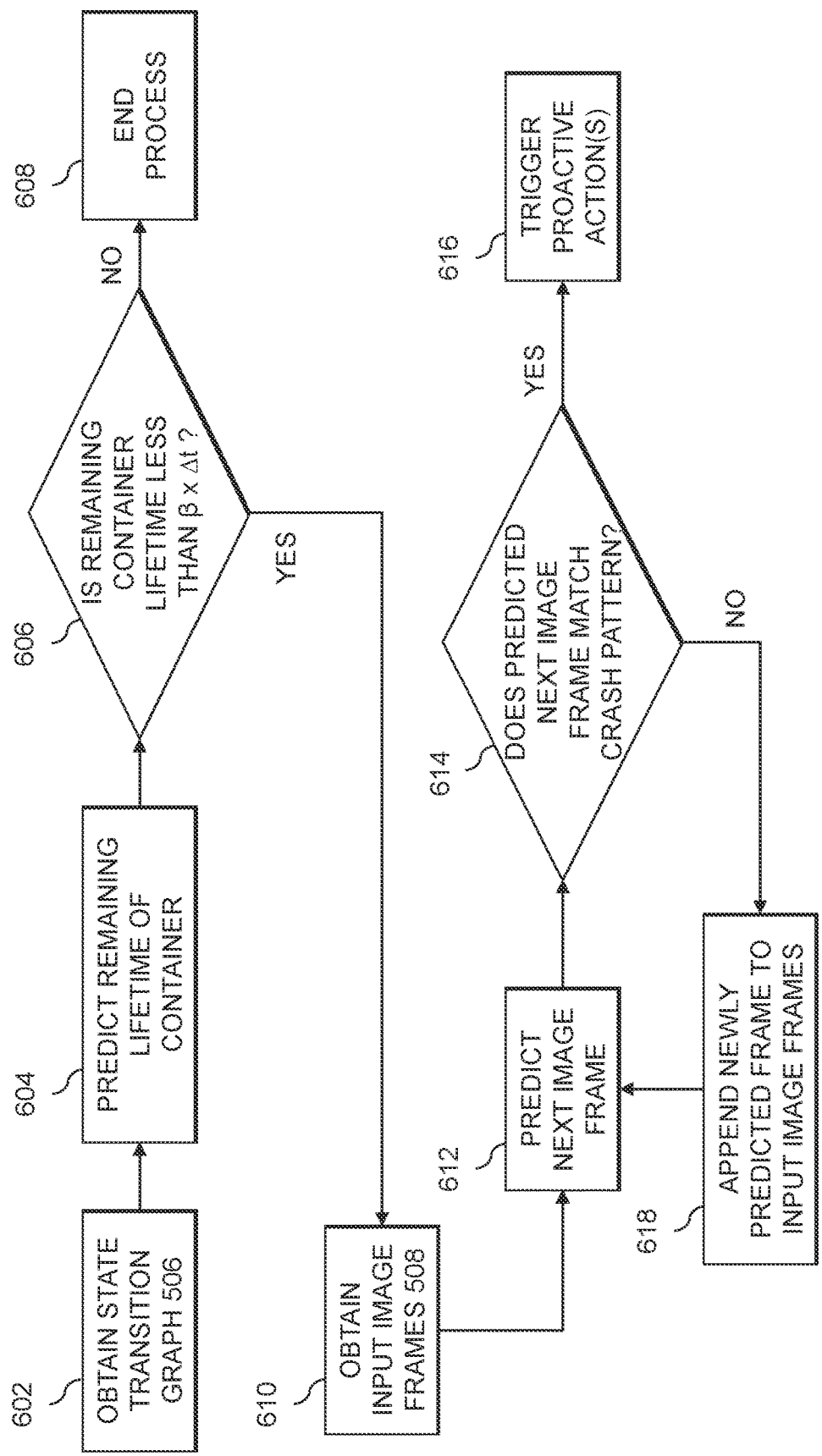
FIG. 6 shows a flow chart of an incident prediction process in an illustrative embodiment.

FIG. 5 shows data preprocessing techniques that are used in conjunction with the container incident prediction process shown in FIG. 6. Specifically, FIG. 5 depicts telemetry data captured for a container $C_K$ from a container start time, $T_0$ to a current time, $T_{PRESENT}$, as represented by the events timeline 502. The captured telemetry data is used to generate the telemetry dataset 504, which is transformed into a state transition graph 506 using the process described in conjunction with FIG. 2A-2B, for example. In the example shown in FIG. 5, it is assumed that the container $C_K$ is hosted on edge server 120-1.

Referring also to FIG. 6, this figure shows a process flow diagram of an incident prediction process in an illustrative embodiment. Step 602 includes obtaining the state transition graph 506 from FIG. 5, and step 604 includes predicting a remaining lifetime of the container $C_K$ by providing the state transition graph 506 to the edge state model 124. For example, the remaining lifetime of the container $C_K$ may be predicted based on the following steps:
1. Determining all possible paths from the given state to a failure state (e.g., using one or more graph algorithms).
2. Computing a probability of each path on the state transition graph based by multiplying the respective transition probabilities along the path.
3. Selecting the number of time steps (N) to be used by identifying the path with the maximum computed probability and setting N to be equal to the number of state transitions in that path (e.g., if telemetry data is captured every 5 milliseconds, then the remaining lifetime of the container is equal to N×5 milliseconds).

Step 606 includes performing a test to determine whether the remaining container lifetime is less than β×Δt, where β is a predetermined constant based on the estimated time needed to repair or fix the container, and Δt is the time frame width, as described in conjunction with FIG. 3, for example. If no, then the process ends as indicated by step 608. β can be a tunable parameter provided by a user, for example.

If yes, then step 610 includes obtaining input image frames 508. More specifically, step 610 includes computing an iteration count based on the number of remaining container lifetime steps, wherein the iteration count is equal to the remaining container lifetime/Δt. The telemetry dataset 504 in FIG. 5 is converted into a sequence of image frames 508 (using the image builder 306, for example).

Step 612 includes predicting a next image frame by providing the sequence of image frames 508 to the edge image prediction module 126.

Step 614 includes performing a test to determine if the predicted next image frame matches a crash pattern. For example, step 614 may be based on the output of the edge discriminator model 128 when the predicted next image frame is provided as input. If a match is found, then step 616 includes triggering one or more proactive actions. By way of example, in some embodiments, step 616 may include triggering or alerting one or more proactive repair systems that can automatically perform various kinds of actions, including restarting of the container and/or rolling back a deployment or configuration of a container, for example.

If a match is not found at step 614, then step 618 includes appending the predicted next image frame to the obtained input frames 508. Steps 612, 614, and 618 are repeated based on the iteration count computed at step 610, or until a match is found at step 614.

Figure 7:
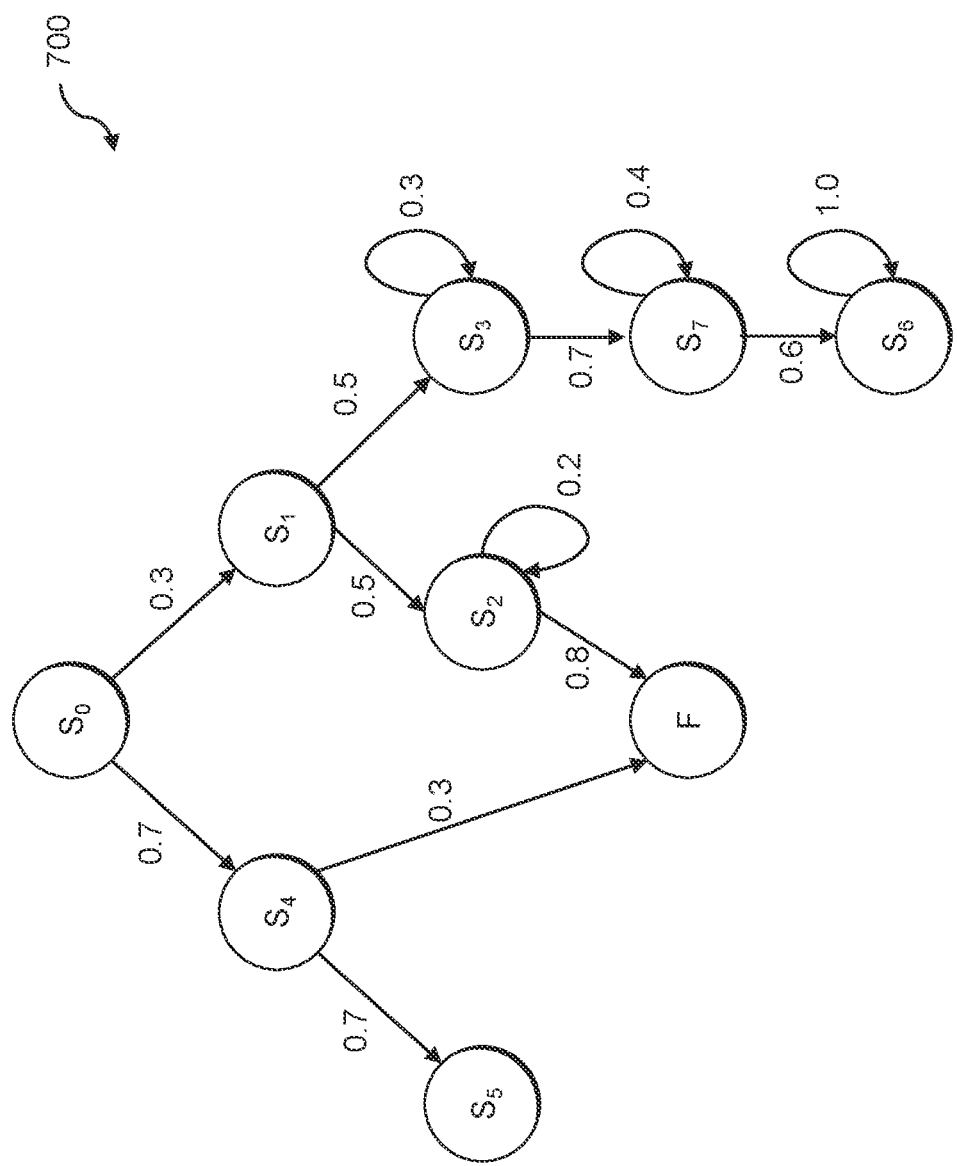
FIG. 7 shows an example of a state transition graph in an illustrative embodiment.

FIG. 7 shows a specific example of computing a remaining container lifetime based on a state transition graph 700 in an illustrative embodiment. Assume that the current state of a given container is at node $S_0$. To compute the remaining container lifetime, all of the possible paths to a failures state (corresponding to node F in this example) are found, and respective path probabilities are computed. For the state transition graph 700, the possible paths include $S_0 \rightarrow S_4 \rightarrow F$ and $S_0 \rightarrow S_1 \rightarrow S_2 \rightarrow F$. The respective path probabilities are computed as 0.7×0.3=0.21, and 0.3×0.5×0.8=0.12. Therefore, for the state transition graph 700, $S_0 \rightarrow S_4 \rightarrow F$ is the highest probability path, and the number of state transitions is equal to two. If the telemetry data is captured every 5 milliseconds, then the remaining container lifetime is predicted as 2*5 milliseconds=10 milliseconds.

As such, at least one embodiment of the present disclosure provides a convolutional LSTM model that is configured to predict a next image frame (e.g., one frame at a time) that follows an input sequence of images representing telemetry data. Generally, the number of frames that a convolutional LSTM must predict is not a constant or a configurable parameter. Thus, a Markov chain model is used to predict the remaining lifetime of the container, and the number of frames that the convolutional LSTM model is to predict is based on the predicted remaining lifetime of the container.

Further, one or more embodiments provide tunable parameters (e.g., the "z" parameter), that can easily be adjusted based on a specified time needed for at least one action to be performed on the container. Such embodiments not only provide the capability to accurately predict container incidents, but also allow such predictions to be made at a time when the at least one action can be performed to avoid down time.

Moreover, embodiments described herein can utilize federated learning based on intelligence of the diversified models obtained from different edge servers. These models learn on the same telemetry dataset of an edge container presented in different formats (e.g., state transition graphs and sequence of image frames), and then each of the models is used to solve a specific problem (prediction of container lifetime, prediction of image frame, and matching of the predicted image frame to container crash pattern(s)).

FIG. 8 shows an example of a specification of a machine learning model architecture for an image prediction in an illustrative embodiment. Specifically, FIG. 8 shows the various layers and the number of parameters of the machine learning model architecture 800, which in this example corresponds to a convolutional LSTM model.

FIG. 9 shows an example of a specification of a discriminator architecture in an illustrative embodiment. In particular, FIG. 9 depicts the various layers and the number of parameters of the machine learning model architecture 900, which in this example corresponds to a CNN image classifier model.

It is to be appreciated that the particular examples of the specifications of machine learning model architectures shown in FIGS. 8 and 9 are just possible examples, and alternative implementations of the specification can be used in other embodiments, such as specification that include different numbers or types of layers and/or different number of parameters.

Figure 10:
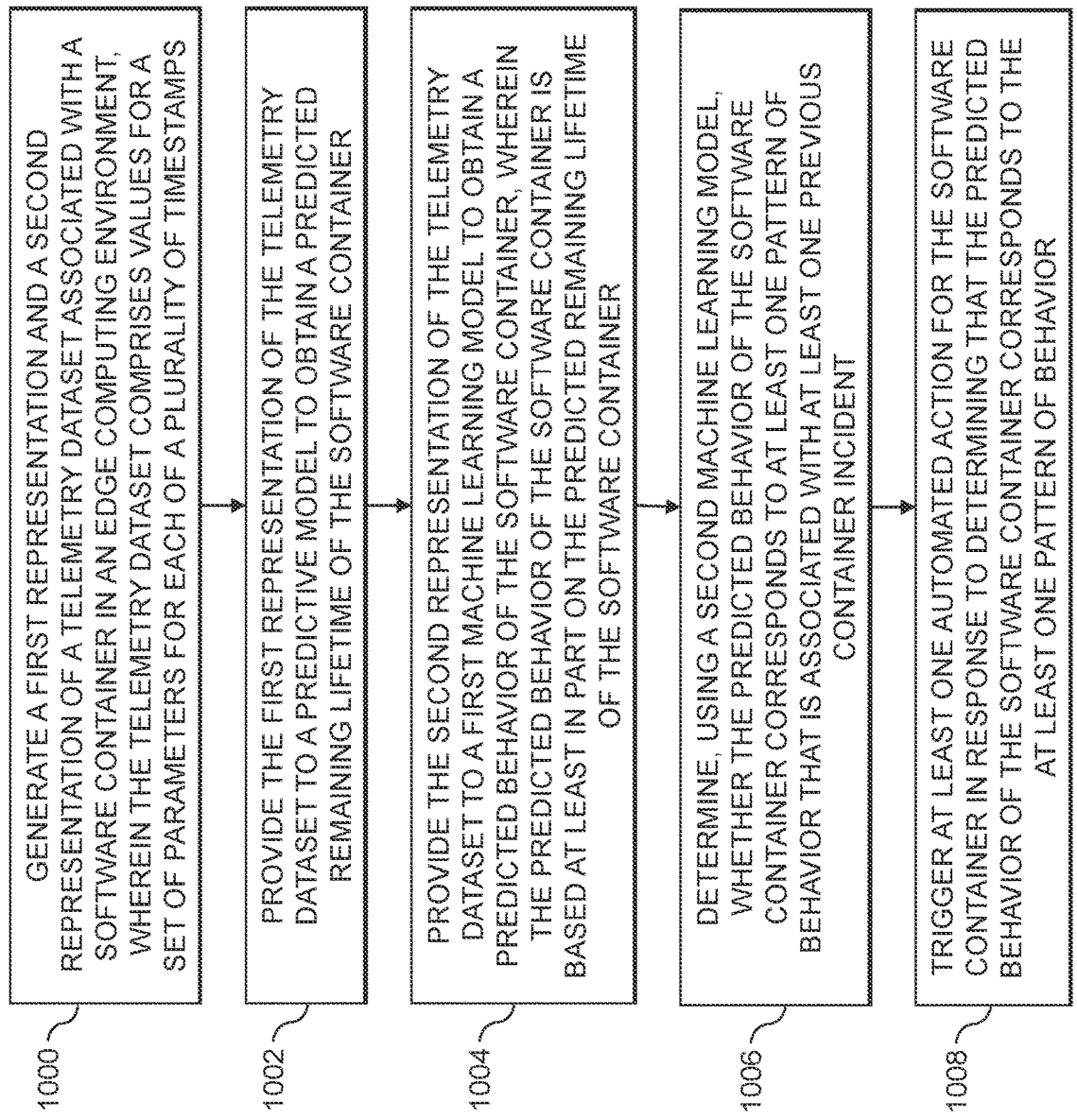
FIG. 10 shows a flow diagram of a process for detecting container incidents using machine learning techniques in an illustrative embodiment.

FIG. 10 is a flow diagram of a process for detecting container incidents using machine learning techniques in an illustrative embodiment. It is to be understood that this particular process is only an example, and additional or alternative processes can be carried out in other embodiments.

In this embodiment, the process includes steps 1000 through 1008. These steps are assumed to be performed by the edge server 120-1 utilizing its elements 122, 124, 126, and 128.

Step 1000 includes generating a first representation and a second representation of a telemetry dataset associated with a software container in an edge computing environment, wherein the telemetry dataset comprises values for a set of parameters for each of a plurality of timestamps. Step 1002 includes providing the first representation of the telemetry dataset to a predictive model to obtain a predicted remaining lifetime of the software container. Step 1004 includes providing the second representation of the telemetry dataset to a first machine learning model to obtain a predicted behavior of the software container, wherein the predicted behavior of the software container is based at least in part on the predicted remaining lifetime of the software container. Step 1006 includes determining, using a second machine learning model, whether the predicted behavior of the software container corresponds to at least one pattern of behavior that is associated with at least one previous container incident. Step 1008 includes triggering at least one automated action for the software container in response to determining that the predicted behavior of the software container corresponds to the at least one pattern of behavior.

At least one of the predictive model, the first machine learning model, and the second machine learning model may be trained by a plurality of edge servers of the edge computing environment using a federation learning process, wherein the federation learning process comprises aggregating training results of the plurality of edge servers at a central server. The set of parameters may include one or more parameters associated with at least one of: usage and performance of the software container. The first representation of the telemetry dataset may include a state transition graph. The predictive model may include at least one of a stochastic model and a Markov chain model. The second representation of the telemetry dataset may include a sequence of image frames, wherein each of the image frames encodes the values captured for the set of parameters over a particular time period corresponding to two or more consecutive ones of the timestamps. The first machine learning model may include a convolutional long short-term memory model that generates at least one additional image frame for the sequence of image frames. The second machine learning model may correspond to a discriminator model comprising a convolutional neural network image classifier. The at least one automated action may include at least one of: restarting the software container and reconfiguring the software container. The at least one pattern of behavior may correspond to a time period occurring prior to the at least one previous container incident, and the length of the time period may be based on at least one tunable parameter associated with at least one of the first and second machine learning models.

Figure 11:
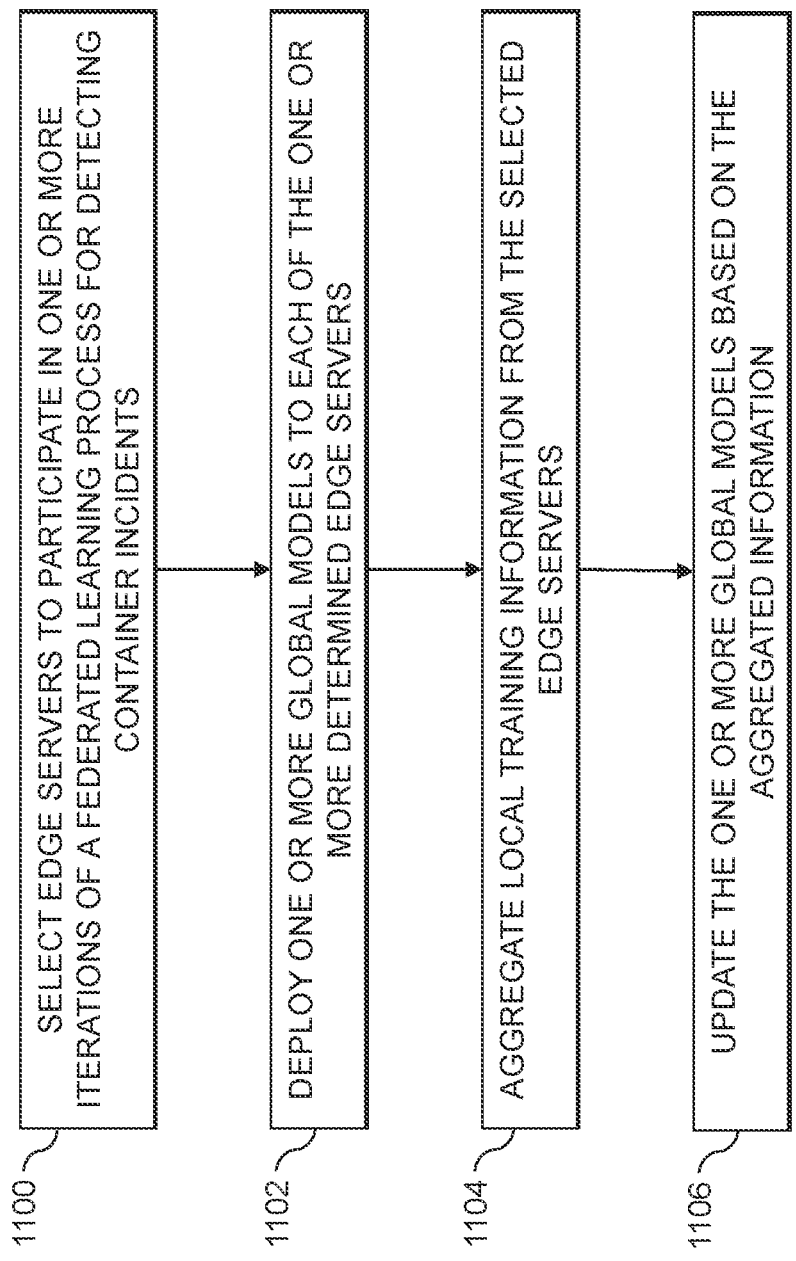
FIG. 11 shows a flow diagram of a federated learning process for detecting container incidents in an illustrative embodiment.

FIG. 11 is a flow diagram of a process for detecting container incidents using machine learning techniques in an illustrative embodiment. It is to be understood that this particular process is only an example, and additional or alternative processes can be carried out in other embodiments.

In this embodiment, the process includes steps 1100 through 1106. These steps are assumed to be performed by one of the cloud servers 110 utilizing its elements 112, 114, 116, and 118.

Step 1100 includes selecting one or more of the edge servers 120 to participate in one or more iterations of a federated learning process for detecting container incidents. Step 1102 includes deploying one or more global models to each of the one or more determined edge servers 120. The one or more models may correspond to at least one of: a predictive model (e.g., state model 112) and one or more machine learning models (e.g., image prediction model 114 and/or discriminator model 116).

Step 1104 includes aggregating local training information from the selected edge servers. For example, the local training information may be obtained from each of the selected edge servers, and may include a set of weights for each of the one or more models.

Step 1106 includes updating the one or more global models based on the aggregated information. For example, the set of weights collected from each of the edge servers for a given one of the models may be averaged to update the given model, which then can be used in a next iteration of the federated learning process, possibly with new and/or different edge servers, for example.

Accordingly, the particular processing operations and other functionality described in conjunction with the flow diagrams of FIGS. 10 and 11 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to predict and address issues with software containers in an edge computing framework before they cause crashes or downtime, for example. These and other embodiments can effectively overcome problems associated with the distributed and decentralized nature of edge computing frameworks. For example, some embodiments are configured to train machine learning models for detecting container incidents using federated learning, thereby enabling a central server to aggregate training results without the need for access to the telemetry training data. These and other embodiments can effectively improve system availability relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 12 and 13. Although described in the context of system 100, these platforms may also be used to implement at least portions of other information processing systems in other embodiments.

Figure 12:
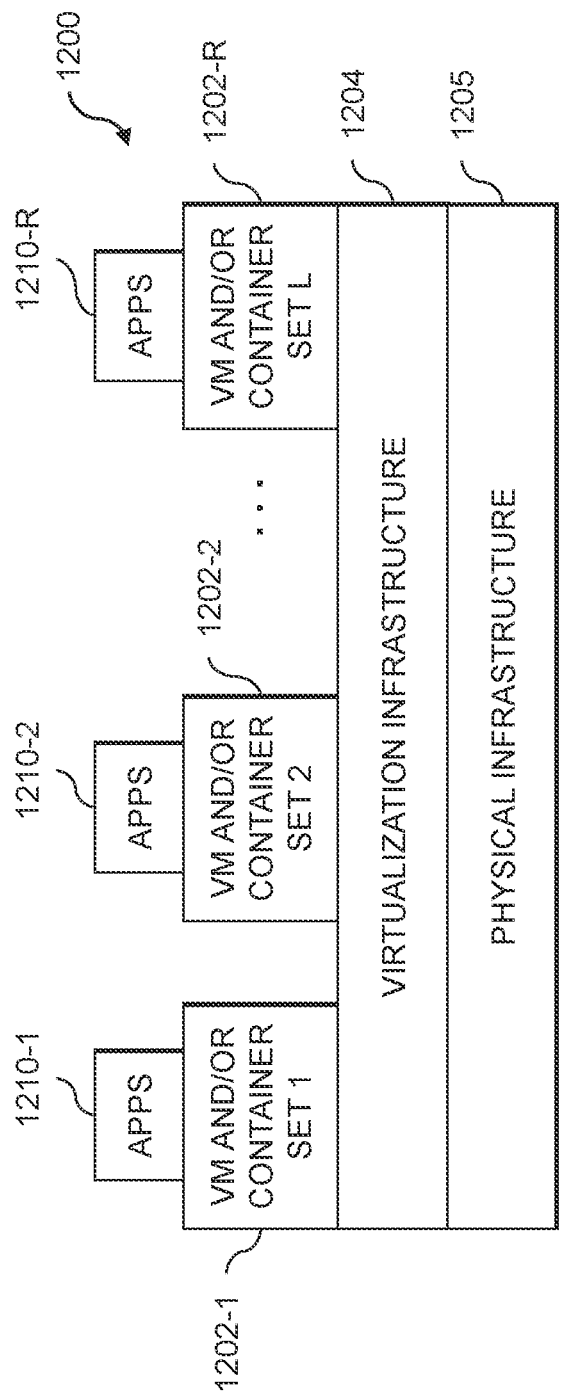
FIGS. 12 and 13 show examples of processing platforms that may be utilized to implement at least a portion of an information processing system in illustrative embodiments.
Figure 13:
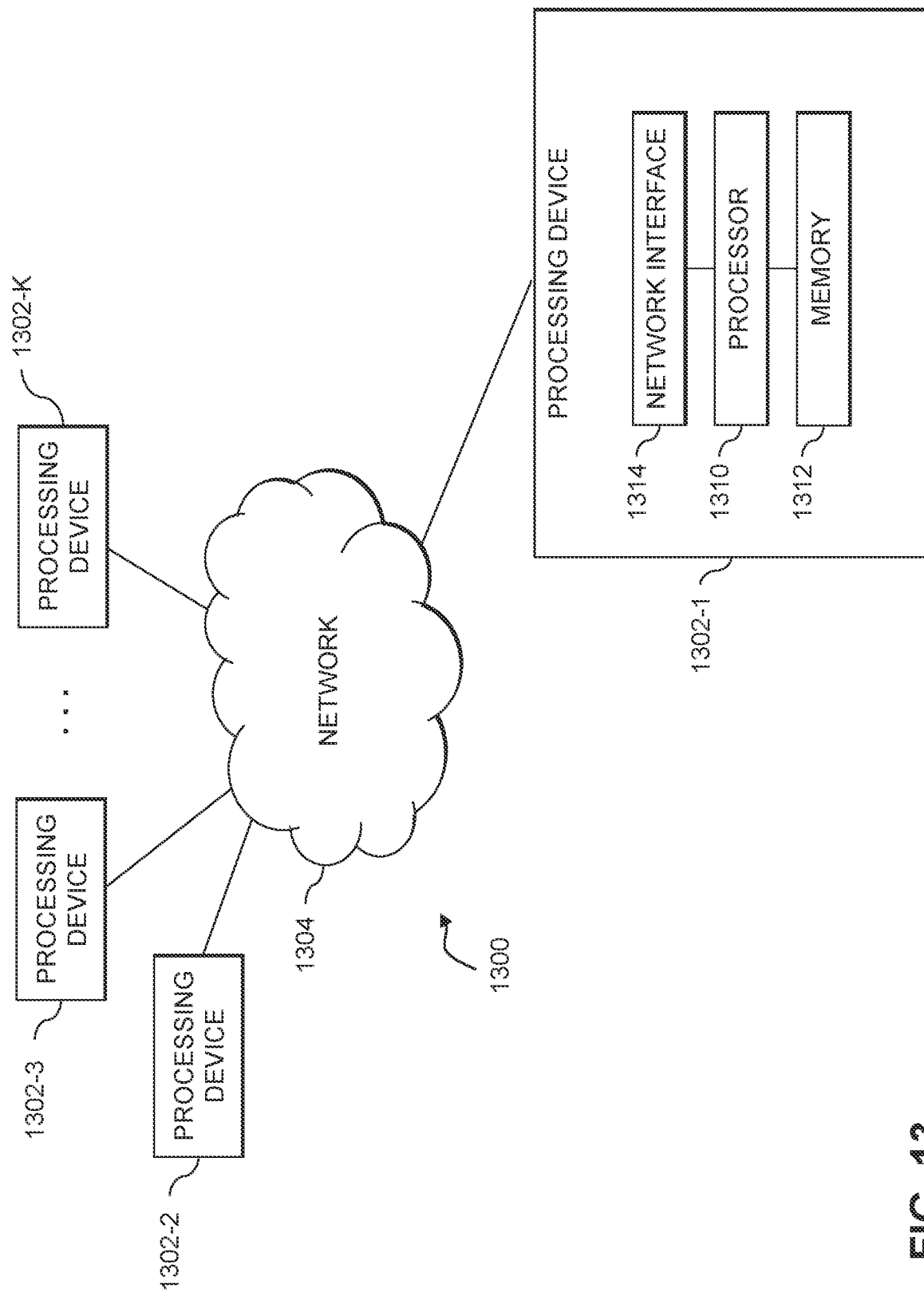

FIG. 12 shows an example processing platform comprising cloud infrastructure 1200. The cloud infrastructure 1200 comprises a combination of physical and virtual processing resources that are utilized to implement at least a portion of the information processing system 100. The cloud infrastructure 1200 comprises multiple virtual machines (VMs) and/or container sets 1202-1, 1202-2, . . . 1202-R implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-R running on respective ones of the VMs/container sets 1202-1, 1202-2, . . . 1202-R under the control of the virtualization infrastructure 1204. The VMs/container sets 1202 comprise respective VMs, respective sets of one or more containers, or respective sets of one or more containers running in VMs. In some implementations of the FIG. 12 embodiment, the VMs/container sets 1202 comprise respective VMs implemented using virtualization infrastructure 1204 that comprises at least one hypervisor.

A hypervisor platform may be used to implement a hypervisor within the virtualization infrastructure 1204, wherein the hypervisor platform has an associated virtual infrastructure management system. The underlying physical machines comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1302-1 in the processing platform 1300 comprises a processor 1310 coupled to a memory 1312.

The processor 1310 comprises a microprocessor, a microcontroller, an application-specific integrated circuit (ASIC), a field-programmable gate array (FPGA) or other type of processing circuitry, as well as portions or combinations of such circuitry elements.

The memory 1312 comprises random access memory (RAM), read-only memory (ROM) or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   generating a first representation and a second representation of a telemetry dataset associated with a software container in an edge computing environment, wherein the telemetry dataset comprises values for a set of parameters for each of a plurality of timestamps, wherein the first representation comprises a state transition graph and the second representation corresponds to a sequence of digital image frames, wherein generating a given digital image frame in the sequence comprises converting the values captured for the set of parameters over a particular time period into pixels;
   providing the first representation of the telemetry dataset to a predictive model to obtain a predicted remaining lifetime of the software container;
   providing the second representation of the telemetry dataset to a first machine learning model to obtain a predicted behavior of the software container, wherein the predicted behavior of the software container is based at least in part on the predicted remaining lifetime of the software container;
   determining, using a second machine learning model, whether the predicted behavior of the software container corresponds to at least one pattern of behavior that is associated with at least one previous container incident; and
   triggering at least one automated action for the software container in response to determining that the predicted behavior of the software container corresponds to the at least one pattern of behavior;
   wherein the method is performed by at least one processing device comprising a processor coupled to a memory.

2. The computer-implemented method of claim 1, wherein at least one of the predictive model, the first machine learning model, and the second machine learning model is trained by a plurality of edge servers of the edge computing environment using a federation learning process, wherein the federation learning process comprises aggregating training results of the plurality of edge servers at a central server.

3. The computer-implemented method of claim 1, wherein the set of parameters comprises one or more parameters associated with at least one of: usage and performance of the software container.

4. The computer-implemented method of claim 1, wherein the predictive model comprises at least one of: a stochastic model and a Markov chain model.

5. The computer-implemented method of claim 1, wherein the particular time period corresponds to two or more consecutive ones of the timestamps.

6. The computer-implemented method of claim 5, wherein the first machine learning model comprises a convolutional long short-term memory model that generates at least one additional digital image frame for the sequence of digital image frames.

7. The computer-implemented method of claim 6, wherein the second machine learning model corresponds to a discriminator model comprising a convolutional neural network image classifier.

8. The computer-implemented method of claim 1, wherein the at least one automated action comprises at least one of: restarting the software container and reconfiguring the software container.

9. The computer-implemented method of claim 1, wherein the at least one pattern of behavior corresponds to a time period occurring prior to the at least one previous container incident, wherein the length of the time period is based on at least one tunable parameter associated with at least one of the first and second machine learning models.

10. The computer-implemented method of claim 1, wherein the pixels in the given digital image frame correspond to a red-green-blue color space.

11. A non-transitory processor-readable storage medium having stored therein program code of one or more software programs, wherein the program code when executed by at least one processing device causes the at least one processing device:
  to generate a first representation and a second representation of a telemetry dataset associated with a software container in an edge computing environment, wherein the telemetry dataset comprises values for a set of parameters for each of a plurality of timestamps, wherein the first representation comprises a state transition graph and the second representation corresponds to a sequence of digital image frames, wherein generating a given digital image frame in the sequence comprises converting the values captured for the set of parameters over a particular time period into pixels;
  to provide the first representation of the telemetry dataset to a predictive model to obtain a predicted remaining lifetime of the software container;
  to provide the second representation of the telemetry dataset to a first machine learning model to obtain a predicted behavior of the software container, wherein the predicted behavior of the software container is based at least in part on the predicted remaining lifetime of the software container;
  to determine, using a second machine learning model, whether the predicted behavior of the software container corresponds to at least one pattern of behavior that is associated with at least one previous container incident; and
  to trigger at least one automated action for the software container in response to determining that the predicted behavior of the software container corresponds to the at least one pattern of behavior.

12. The non-transitory processor-readable storage medium of claim 11, wherein at least one of the predictive model, the first machine learning model, and the second machine learning model is trained by a plurality of edge servers of the edge computing environment using a federation learning process, wherein the federation learning process comprises aggregating training results of the plurality of edge servers at a central server.

13. The non-transitory processor-readable storage medium of claim 11, wherein the set of parameters comprises one or more parameters associated with at least one of: usage and performance of the software container.

14. The non-transitory processor-readable storage medium of claim 11, wherein the particular time period corresponds to two or more consecutive ones of the timestamps.

15. The non-transitory processor-readable storage medium of claim 14, wherein the first machine learning model comprises a convolutional long short-term memory model that generates at least one additional digital image frame for the sequence of digital image frames.

16. An apparatus comprising:
  at least one processing device comprising a processor coupled to a memory;
  the at least one processing device being configured:
  to generate a first representation and a second representation of a telemetry dataset associated with a software container in an edge computing environment, wherein the telemetry dataset comprises values for a set of parameters for each of a plurality of timestamps, wherein the first representation comprises a state transition graph and the second representation corresponds to a sequence of digital image frames, wherein generating a given digital image frame in the sequence comprises converting the values captured for the set of parameters over a particular time period into pixels;
  to provide the first representation of the telemetry dataset to a predictive model to obtain a predicted remaining lifetime of the software container;
  to provide the second representation of the telemetry dataset to a first machine learning model to obtain a predicted behavior of the software container, wherein the predicted behavior of the software container is based at least in part on the predicted remaining lifetime of the software container;
  to determine, using a second machine learning model, whether the predicted behavior of the software container corresponds to at least one pattern of behavior that is associated with at least one previous container incident; and
  to trigger at least one automated action for the software container in response to determining that the predicted behavior of the software container corresponds to the at least one pattern of behavior.

17. The apparatus of claim 16, wherein at least one of the predictive model, the first machine learning model, and the second machine learning model is trained by a plurality of edge servers of the edge computing environment using a federation learning process, wherein the federation learning process comprises aggregating training results of the plurality of edge servers at a central server.

18. The apparatus of claim 16, wherein the set of parameters comprises one or more parameters associated with at least one of: usage and performance of the software container.

19. The apparatus of claim 16, wherein the particular time period corresponds to two or more consecutive ones of the timestamps.

20. The apparatus of claim 19, wherein the first machine learning model comprises a convolutional long short-term memory model that generates at least one additional digital image frame for the sequence of digital image frames.

* * * * *